United States Patent
Jiang

(10) Patent No.: US 9,861,221 B2
(45) Date of Patent: Jan. 9, 2018

(54) PACKAGE RECEIVING SYSTEMS AND METHODS

(71) Applicant: Shuai Jiang, San Mateo, CA (US)

(72) Inventor: Shuai Jiang, San Mateo, CA (US)

(73) Assignee: Shuai Jiang, San Mateo, CA (US)

( * ) Notice: Subject to any disclaimer, the term of this patent is extended or adjusted under 35 U.S.C. 154(b) by 105 days.

(21) Appl. No.: 15/152,203

(22) Filed: May 11, 2016

(65) Prior Publication Data

US 2016/0331171 A1 Nov. 17, 2016

Related U.S. Application Data

(60) Provisional application No. 62/159,840, filed on May 11, 2015.

(51) Int. Cl.
*A47G 29/14* (2006.01)
*G06Q 10/08* (2012.01)
*E05B 47/00* (2006.01)

(52) U.S. Cl.
CPC ............ *A47G 29/141* (2013.01); *E05B 47/00* (2013.01); *G06Q 10/0833* (2013.01); *A47G 2029/145* (2013.01); *A47G 2029/149* (2013.01); *E05B 2047/0067* (2013.01)

(58) Field of Classification Search
CPC ............... A47G 29/141; A47G 29/124; A47G 29/1214; A47G 29/20; A47G 2029/145; A47G 2029/149; A47G 2029/1226; E05B 47/00; E05B 2047/0067; G06Q 10/0833
USPC ......... 232/44, 19, 45, 17, 38, 34; 340/568.1, 340/569
See application file for complete search history.

(56) References Cited

U.S. PATENT DOCUMENTS

| | | | | |
|---|---|---|---|---|
| 5,979,750 A | * | 11/1999 | Kindell | A47G 29/141 232/1 R |
| 6,204,763 B1 | * | 3/2001 | Sone | A47G 29/141 221/2 |
| 6,426,699 B1 | | 7/2002 | Porter | |
| 6,483,433 B2 | * | 11/2002 | Moskowitz | A47G 29/141 232/34 |

(Continued)

FOREIGN PATENT DOCUMENTS

| JP | H07139270 | 5/1995 |
|---|---|---|
| JP | H07139270 A | 5/1995 |

(Continued)

OTHER PUBLICATIONS

International Search Report and Written Opinion in International Patent Application No. PCT/US15/61127, filed Nov. 17, 2015. dated Apr. 7, 2016. 15 pages.

(Continued)

*Primary Examiner* — William Miller
(74) *Attorney, Agent, or Firm* — Kwan & Olynick LLP

(57) ABSTRACT

A package receiving device, the package receiving device includes a sensor configured to obtain package identifying information from a package, a verification module configured to determine if the package identifying information matches information stored in a computer-readable storage media, and a receptacle configured to change from a compact mode to an extended mode to secure the package based on a determination of the verification module. Securing the package includes enclosing the package in the receptacle.

5 Claims, 11 Drawing Sheets

(56) References Cited

U.S. PATENT DOCUMENTS

| | | | | |
|---|---|---|---|---|
| 6,612,489 | B2* | 9/2003 | McCormick | A47G 29/10 235/382 |
| 6,957,767 | B2* | 10/2005 | Aupperle | A47G 29/1214 232/34 |
| 8,358,195 | B2* | 1/2013 | Giles | A47G 29/141 340/5.51 |
| 2003/0097287 | A1 | 5/2003 | Franz et al. | |
| 2003/0231112 | A1* | 12/2003 | Raju | A47G 29/141 340/569 |
| 2005/0262028 | A1 | 11/2005 | Mayer et al. | |
| 2008/0067227 | A1* | 3/2008 | Poss | A47G 29/22 232/17 |
| 2012/0269461 | A1 | 10/2012 | Proctor et al. | |
| 2013/0080258 | A1 | 3/2013 | Tran | |
| 2013/0147626 | A1 | 6/2013 | Hammond | |
| 2015/0102903 | A1* | 4/2015 | Wilkinson | G07C 9/00896 340/5.61 |
| 2015/0108209 | A1* | 4/2015 | Cho | A47G 29/1212 232/34 |
| 2015/0359372 | A1* | 12/2015 | Cho | A47G 29/1245 232/18 |
| 2016/0374494 | A1* | 12/2016 | Geng | A47G 29/141 232/17 |

FOREIGN PATENT DOCUMENTS

| | | |
|---|---|---|
| WO | 2013169114 A1 | 11/2013 |
| WO | WO 2013/169114 | 11/2013 |

OTHER PUBLICATIONS

"International Application Serial No. PCT/US15/61127, Search Report and Written Opinion dated Apr. 7, 2016", 14 pgs.

* cited by examiner

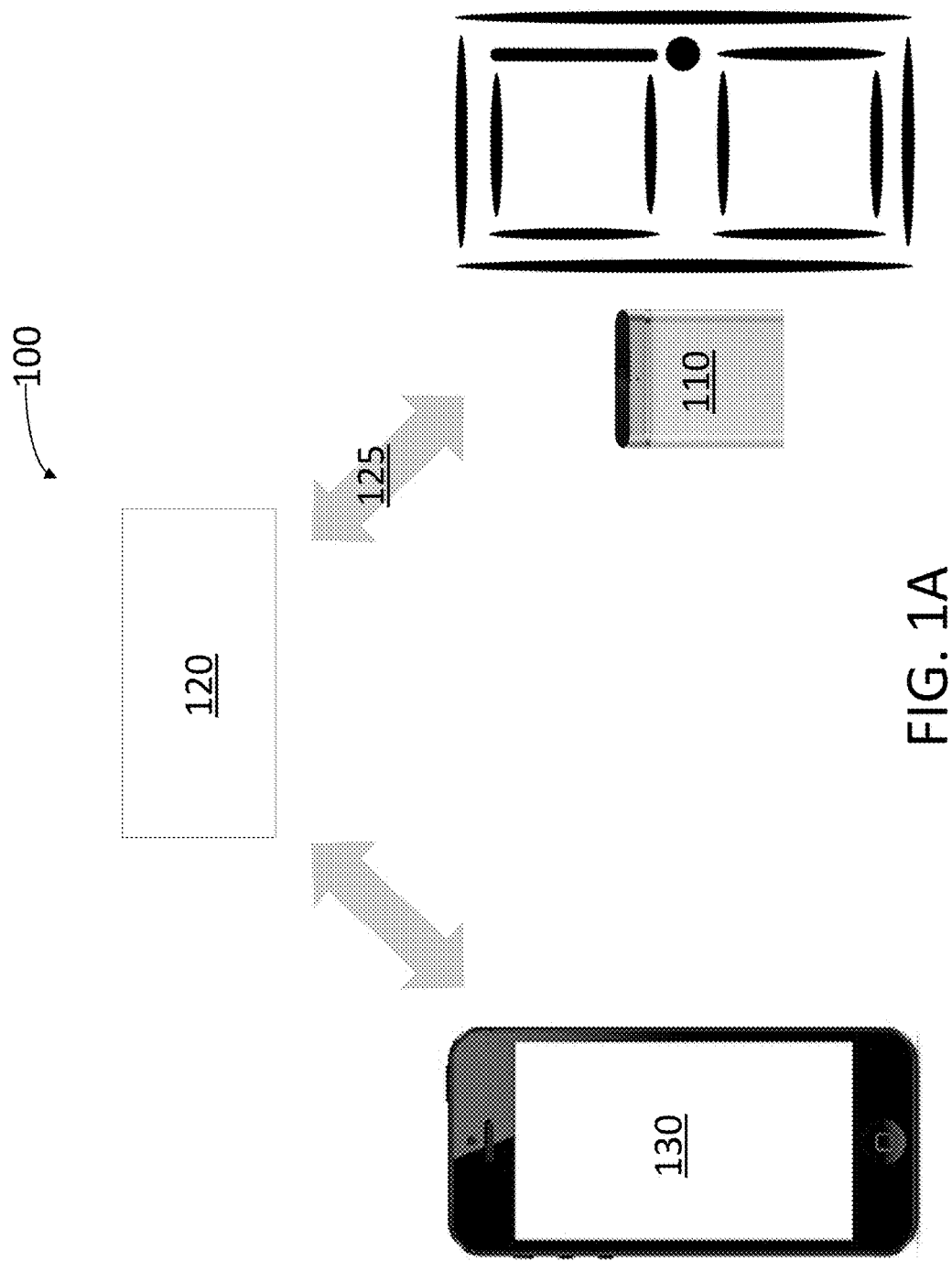

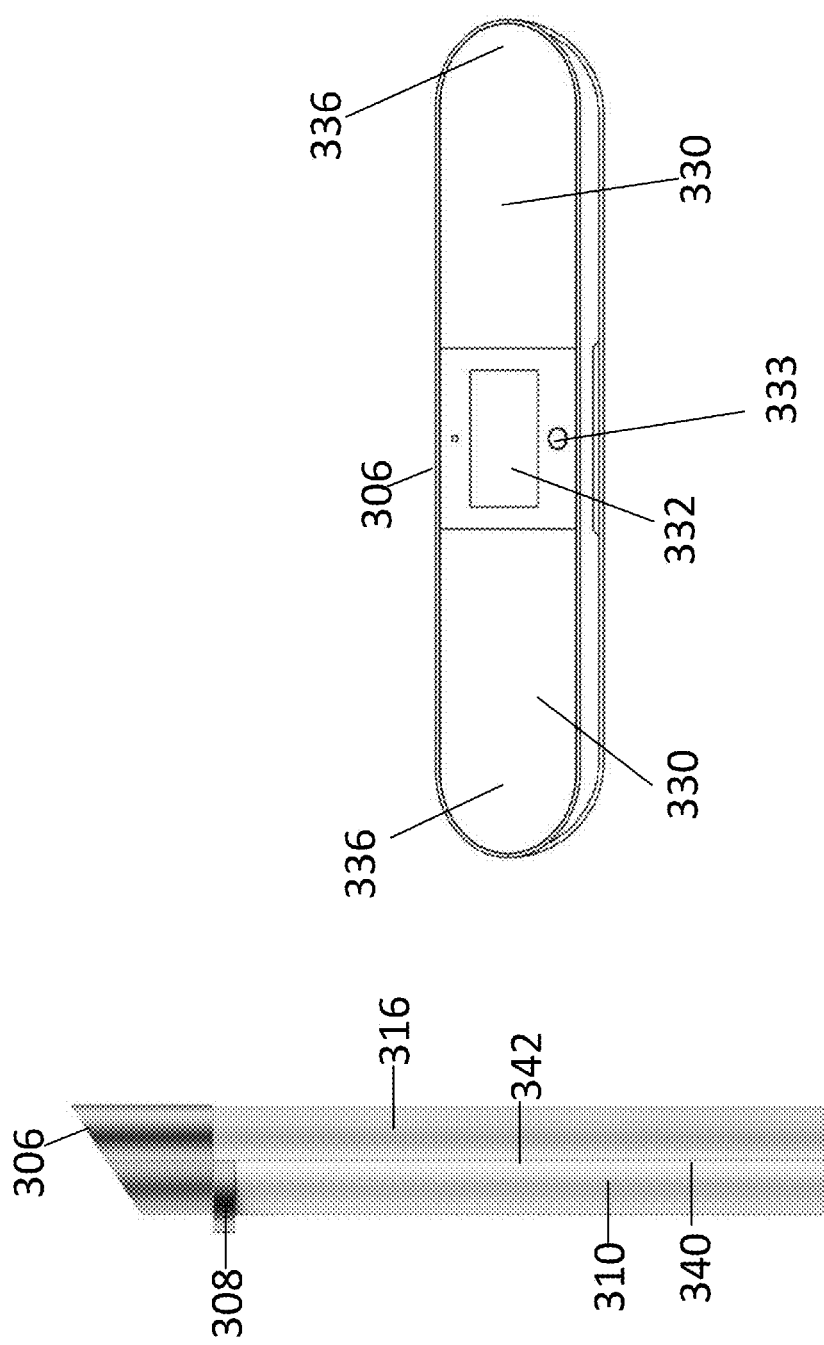

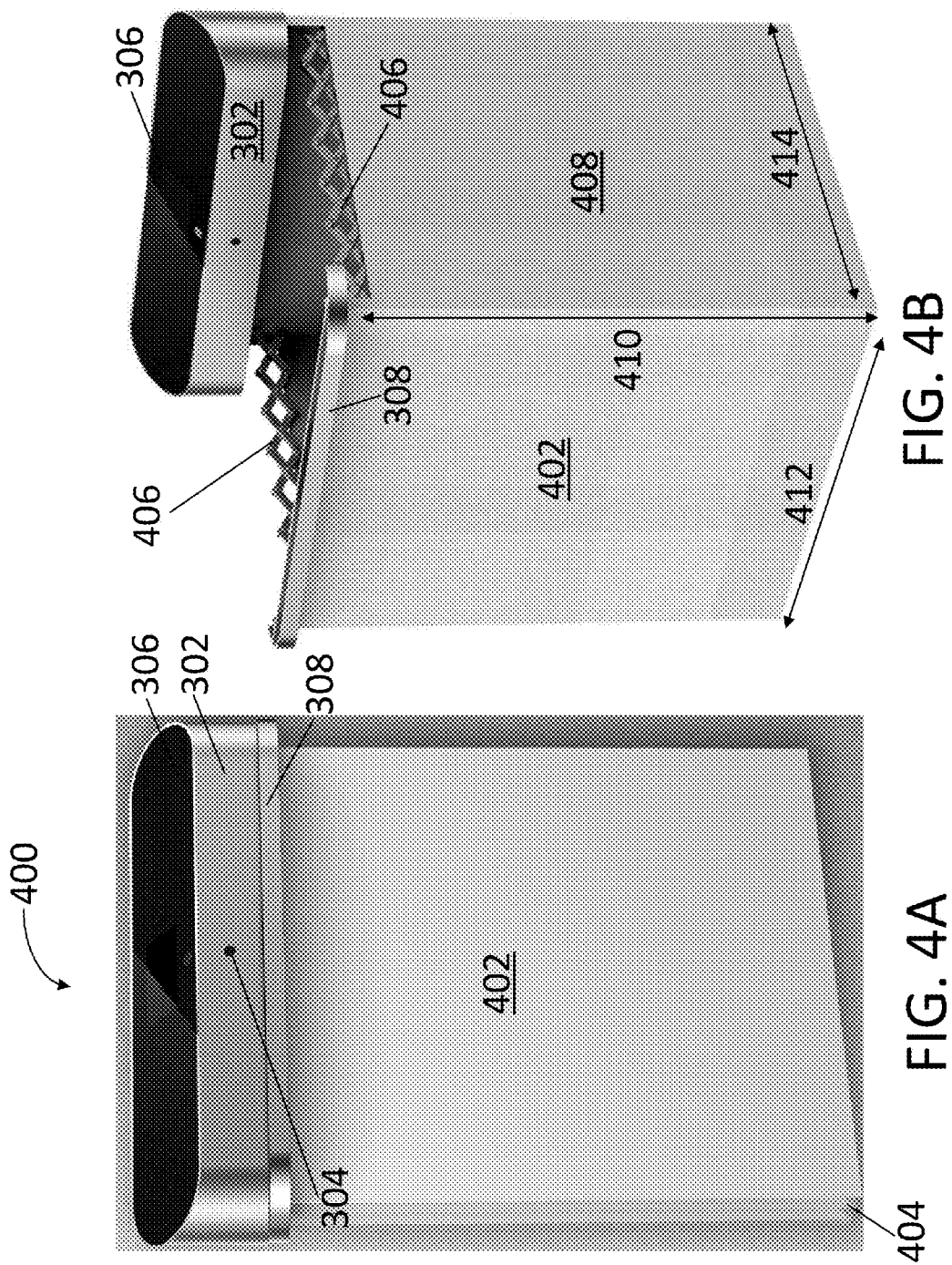

PACKAGE RECEIVING SYSTEMS AND METHODS

CROSS-REFERENCE TO RELATED APPLICATION

This application claimed priority to U.S. Application Ser. No. 62/159,840 filed on May 11, 2015, which is incorporated herein by reference.

TECHNICAL FIELD

This invention relates to package receiving systems and methods.

BACKGROUND

Theft of packages delivered to locations that are publicly accessible (e.g., a front porch or door step of a residential unit) can be a concern, especially in light of the rise of online shopping, and the use of delivery services for online order fulfillment. For example, delivered packages may be left unattended at residential locations due to work schedules of the package recipients. Deliveries for which recipient signatures are needed for the release of the packages from the courier, while secure, may not be compatible with the schedules of the recipients.

SUMMARY

Package receiving systems and methods described here can provide a convenient and reliable way to receive packages. A package receiving system includes a receptacle that opens to accept and secure a package based on information (e.g., tracking information) provided by a sender of the package. The received packages can be securely stored in a publicly accessible location before they are retrieved by the recipient. The receiving systems can be provided at the residence of the recipient of the package, eliminating the need for using of and traveling to a third party location to retrieve the packages. The receiving systems and methods can also increase an accuracy of package delivery. For example, packages designated for another recipient at another (e.g., second) location would not be accepted by the package receiving system (at a first location). The package receiving systems can also be used for returning of goods. In addition, the package receiving systems can also be configured to receive groceries and take-out items.

In one aspect, a package receiving device includes a sensor configured to obtain package identifying information from a package, a verification module configured to determine if the package identifying information matches information stored in a computer-readable storage media, and a receptacle configured to change from a compact mode to an extended mode to secure the package based on a determination of the verification module. Securing the package includes enclosing the package in the receptacle.

Implementations can include one or more of the following features. The receptacle can include a movable surface that can contact a floor surface when the package is secured by the receptacle in the extended mode. The surface of the receptacle does not contact the ground surface when the receptacle is in the compact mode. The receiving system is configured to be mounted on a vertical surface perpendicular to the ground surface. The receptacle can be stowed behind a front cover when the receptacle is in the compact mode. The front cover can rest on the ground surface when the receptacle is in the extended mode. The receptacle can further include a support frame, the receptacle can have a first connecting section extending between the front cover and the support frame. The receptacle can include a hinge. The support frame can be pivotally lowered about the hinge into a horizontal position from an initial vertical position of the compact mode when the receptacle is in the extended mode. The receptacle can include a locking frame, and a second connecting section, the second connecting section can extend between the support frame and the locking frame. The locking frame can be pivotally lifted about the hinge from a horizontal position into a locked vertical position. The first connecting section of the receptacle can be a material that is resistant to cutting. The material can include a spun polymer fiber having a tensile strength of at least 3,000 MPa. The receptacle can expand a folding support frame in the extended mode. The sensor can include a camera, and the package identifying information can include an image of a bar code on the package. The receptacle can receive the package in the extended mode if the bar code matches the information stored in the computer-readable storage media. The package receiving device of claim 3 can include a lock that can release the receptacle to secure the package by locking the receptacle after the package has been received. The computer-readable storage media can communicate with and download information from a server. The verification module can send a notification message to a remote system when the receptacle changes from the compact mode to the extended mode.

The package receiving system device can include a motion sensor. The sensor can include a camera and the camera can capture an image when the motion sensor is activated. The package receiving system can include a power source. The sensor and the verification module can standby mode until the motion sensor is activated. Power source can include a solar panel.

In another aspect, a method of receiving a package includes storing at a first location, information regarding the package, receiving, at the first location, package identifying information derived from the package, determining if the package identifying information matches the information; and changing a receptacle from a compact mode to an extended mode to secure the package at the first location until an authorized retrieval when a match is determined.

Implementations can include one or more of the following feature. The information comprises a tracking number of the package. The package identifying information includes an image of a bar code on the package, the bar code containing information about the tracking number. The package identifying information is generated by a courier capturing the image of the bar code on the package using a camera at the first location. Determining if the package identifying information can match the information is performed by a verification module at the first location, the camera being in electronic communication with the verification module. The recipient of the package can use a client device to establish a connection with the verification module. The connection can include a Bluetooth connection and the Bluetooth connection can authorize a processor connected to the verification module to send control signals to open the receiving receptacle for authorized retrieval. The verification module can control the release and the opening of the receiving receptacle at the first location. A surface of the receiving receptacle does not contact a ground surface in the compact mode. Securing the package at the first location can include locking the receiving receptacle. The information regarding the package can be provided to the first location by a back-end system. The back-end system can receive the information regarding the package from a sender of the package. The sender can be a retailer, and the package can be an on order fulfillment. The first location can be at a residence of a recipient of the package. The package can include grocery.

In another aspect, a package receiving system includes a receptacle having an electronic lock, a sensor mounted on the receptacle, the sensor configured to obtain package identifying information from a package placed in proximity to the sensor, a processor mounted on the receptacle and configured to receive tracking information from a remote server system and determine if the package identifying information matches the tracking information and send, based on a determination that the package identifying information matches the tracking information, a signal to the electronic lock to cause the electronic lock to unlock. Implementations can include one or more of the following features. The sensor can include a bar code scanner or a RFID tag reader. The receptacle can include a collapsible enclosure.

In another aspect, a non-transitory computer storage medium encoded with a computer program, the computer program comprising instructions that when executed by a system cause the system to perform operations can include storing at a first location, information regarding the package, receiving, at the first location, package identifying information derived from the package, determining if the package identifying information matches the information, and changing a receptacle from a compact mode to an extended mode to secure the package at the first location until an authorized retrieval when a match is determined.

A system can include one or more computers and one or more storage devices storing instructions that are operable, when executed by the one or more computers, to cause the one or more computers to perform operations that includes storing at a first location, information regarding the package, receiving, at the first location, package identifying information derived from the package, determining if the package identifying information matches the information, and changing a receptacle from a compact mode to an extended mode to secure the package at the first location until an authorized retrieval when a match is determined.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1A is a schematic diagram of the delivery management system.

FIG. 3F is a side view of the device shown in FIG. 3A.
FIG. 3G is a front view of a panel of the device shown in FIG. 3A.
FIG. 4A is a front view of a second implementation of the receiving device before a receiving receptacle is deployed.
FIG. 4B is a perspective view of the device shown in FIG. 4A after the receiving receptacle is deployed.

Like reference symbols in the various drawings indicate like elements.

DETAILED DESCRIPTION

Figure 1B:
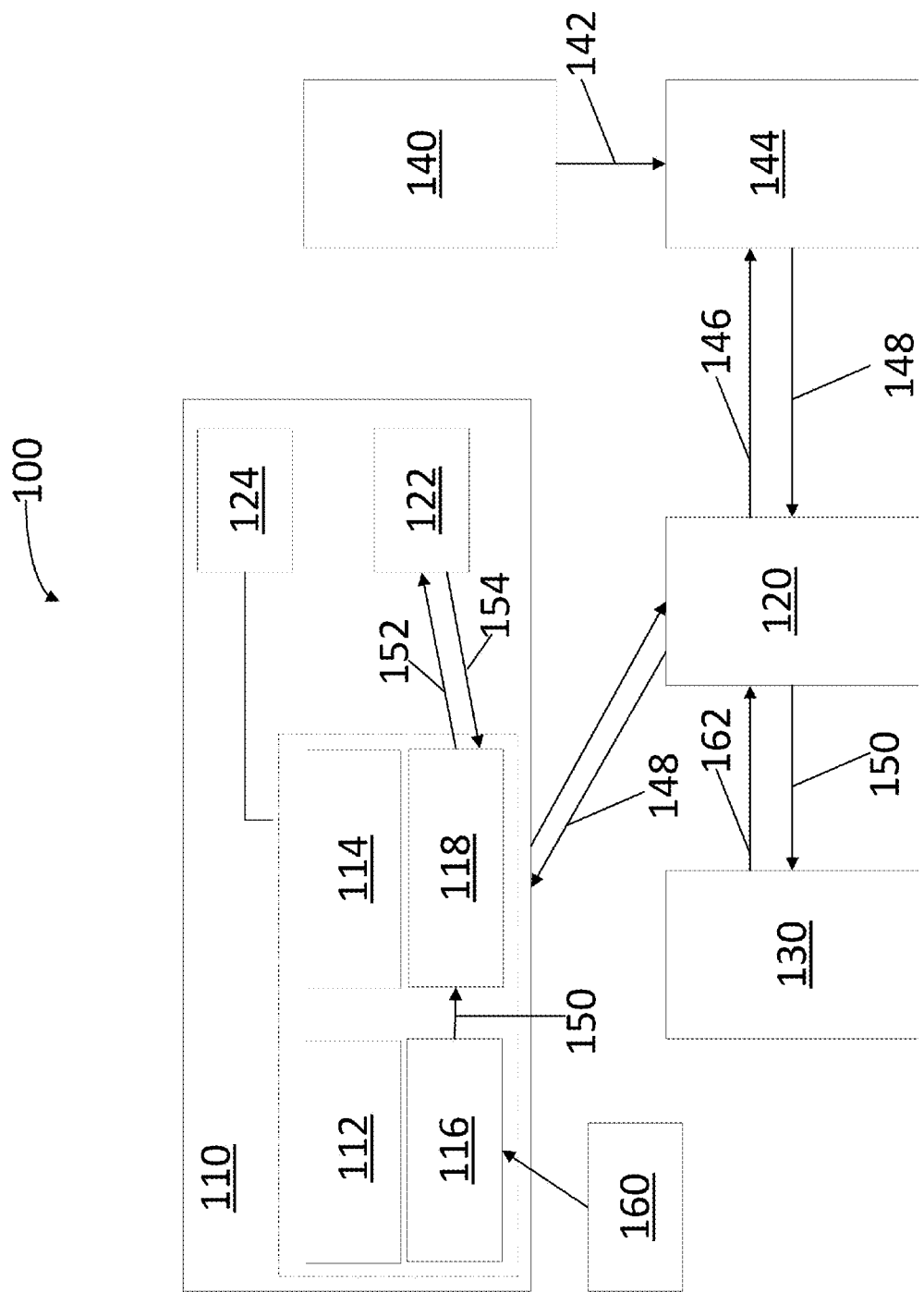
FIG. 1B is a interaction diagram of various components of the delivery management system.

FIG. 1A shows a schematic diagram of a delivery management system 100. A package receiving device 110 is installed at a user location. In some embodiments, the package receiving device 110 is installed on an exterior wall of a residential unit, for example, a house, an apartment complex, a student dormitory. For example, the package receiving device 110 can be installed adjacent a front door of the residential unit. The package receiving device 110 can also be installed at a business or commercial location. In general, the receiving device 110 is installed in a publicly accessible location.

The installed package receiving device 110 is in communication with a back-end system 120 via a communication network 125. The mode of communication can include wireless Internet communication, such as through a WiFi connection to a wireless router in the residential unit (which is in turn connected to an Internet service), by a BlueTooth connection to a receiver in the residential unit (which again is connected, e.g., through a computer to an Internet service), or cellular network communication through a 3G, 4G, or other generation mobile telecommunication network. Device 110 can both receive or download data from the back-end system 120, and can also transmit or upload data to the back-end system 120. Data downloaded from the back-end system 120 onto the package receiving device 110 can include package delivery information, such as, tracking numbers. Data uploaded to the back-end system 120 can include image data captured by a camera installed in the package receiving device 110, or user input provided to the package receiving device 110.

The back-end system 120 can also independently communicate with a client device 130 via a 3G, 4G, or later generation mobile telecommunication network, or through a wireless internet communication. For example, alerts or messages can be sent from the back-end system 120 to the client device 130 with or without input from the receiving device 110. The back-end system 120 can relay information received from the package receiving device 110 to the client device 130. Commands can also be sent from the client device 130 via the back-end system 120 to control or operate the package receiving device 110. For example, commands can be sent from the client device 130 via the back-end system 120 to control the unlocking of the package receiving device 110.

FIG. 1B shows a schematic interaction diagram between different components of the package delivery management system 100. To illustrate the interactions between the different components, an example is provided for a package 160 to be delivered to a user location.

Prior to the Package Arriving at the User Location

The package 160 can be an order fulfillment by a retailer 140 of an online order placed by the recipient. The retailer 140 can send an email 142 to an electronic mailbox 144 that is managed by or to which access is granted to the back end system 120. The mailbox 144 is in communication with the back-end system 120. The email 142 can include package identifying information such as a tracking information and an estimated delivery date. A command 146 is sent by the back-end system 120 to either periodically (e.g., every 20 minutes, every hour, every 6 hour, every day, etc.) scan the mailbox 144 for new emails from retailers, or a specific command is sent from the back-end system 120 to scan the mailbox 144 at a particular time to acquire relevant information 148 (e.g., tracking number, delivery date) about the package. Once the mailbox 144 locates the email 142 specified by the command 146, information 148 is extracted and retrieved by the back-end system 120 from the email 142 in the electronic mailbox 144. The mailbox 144 can be managed by the back-end system 120 and is configured to identify appropriate emails and push the email or relevant information from the emails to the back-end system 120.

The back-end system 120 can also send a notification 150 to the client device 130, alerting the user that a package 160 has been mailed by the retailer 140.

The information 148 (e.g., tracking number etc.) is then sent from the back-end system 120 to the package receiving device 110 via the communication network 125. The package receiving device 110 includes a microprocessor 118, which also includes a computer-readable storage media, such as, a hard drive, and/or flash memory. The tracking number contained in the information 148 is then stored in the computer-readable storage media connected to the microprocessor 118. The back-end system 120 is periodically synchronized (e.g., every hour, every 6 hours, every 12 hours, every day, etc.) with the storage element of the receiving device 110. The computer-readable storage media can store information of all future deliveries as soon as the tracking information becomes available. Alternatively, depending on the frequency of the synchronization between the receiving device 110 and the back-end system 120, tracking information about the packages can be downloaded to the storage unit of the package receiving device 110 only within a selected period (e.g., 1 day, 2 days) before the estimated delivery date of the packages.

Upon the Package Arriving at the User Location

When a courier delivers the package 160 to the user location, a motion sensor 114 in the receiving device is activated, and a screen 112 in the receiving device 110, which may have previously been in hibernation mode, turns on. Alternatively, the receiving device 130 can also be switched on using a switch 124 on the device 130. The screen 112 can be a display screen, or it can be a touch screen. When the screen 112 is a touch screen, the screen 112 can be used as an user input device. For example, a code can be entered using a keyboard displayed on the touch screen.

Figure 2B:
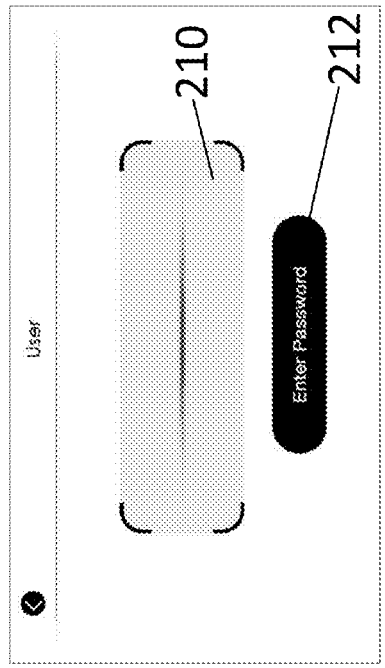
FIG. 2B is a user interface of a receiving device.
Figure 2D:
FIG. 2D is a user interface of a receiving device.
Figure 2A:
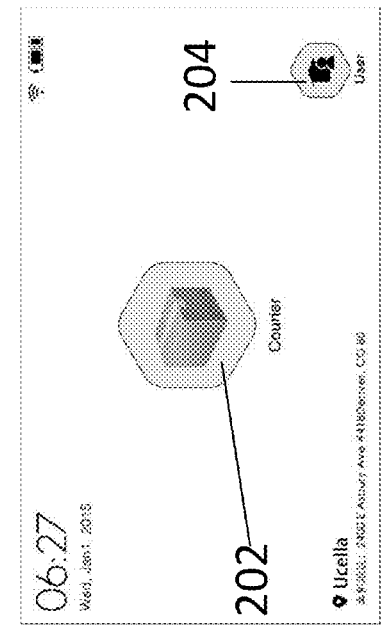
FIG. 2A is a user interface of a receiving device.
Figure 2C:
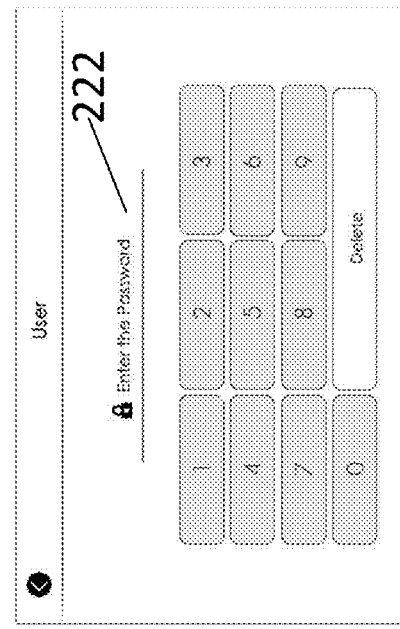
FIG. 2C is a user interface of a receiving device.

FIG. 2A shows an exemplary display on the screen 112 when the receiving device 110 is turned on. The courier can select the courier option 202 on the right, which can then display a prompt screen shown schematically in FIG. 2B. The prompt screen in FIG. 2B requests the courier to align a barcode (containing the tracking number) on package 160 in front of a camera 116 of the receiving device 110, so that the bar code appears within a frame 210. The frame 210 provides a live-feed from the camera 116, and the courier can activate a button 212 to capture an image 150 of the barcode. The image is then sent to The processor 118 receives the image 150 and image processes it to extract the tracking number. The processor 118 includes a verification module that compares the tracking number extracted from the image 150 with the tracking number stored in the storage element connected to the processor 118. When a match is found, (i.e., the package 160 is the correct package that is intended to be delivered to the user location), the processor 118 sends a signal 152 to a lock 122 in the receiving device 110 to unlock it. The lock 122 can be an electronic lock that works using an electronic current and is connected to an access control system. For example, in addition to the pin and tumbler used in standard locks, electronic locks connects the bolt or cylinder to a motor using an actuator. The lock 122 can be a smart electromechanics lock that gets instructions to lock and unlock from an authorized device using a cryptographic key and wireless protocol. The lock 122 can include a latch that engages a strike plate.

In some embodiments, the image 150 of the barcode or tracking number extracted from the image 150 can be sent to the back-end system 120, and the back-end system can send a verification back to the receiving device 110.

Once the lock 122 is unlocked, a receiving receptacle (e.g., a box, a hooded extension) is released from the receiving device 110. The receiving receptacle is in a compact form before the lock 122 is unlocked. Once unlocked, the receiving receptacle can be expanded and extended to enclose and secure a package.

The courier can then deposit the package 160 into the receiving receptacle, and activate the lock again by closing an opening of the receiving receptacle. If the lock 122 is not properly re-locked, the lock 122 sends an error message 154 to the processor 118 and displays a warning message and reminder on the screen 112, requesting the courier to relock the receiving receptacle. If no corrective actions are taken, a speaker on the receiving device 110 sounds a warning to alert the courier that the lock 122 has not been securely relocked.

When the barcode extracted from the image 150 does not match any tracking numbers stored in the storage element, the lock 122 of the receiving device 130 remains locked and the receiving receptacle is not released. In addition, an error message can be displayed on the screen 112 to inform the courier that the package is not one that the receiving device 110 is expecting to receive. Such a delivery management system 100 can improve accuracy of package delivery (i.e., minimize delivery errors of a package being left at a wrong address or at a wrong location).

If the package 160 bears the address of the user location, then the courier can request authorization to deposit the package in the receiving device 110. The authorization request is relayed to the back-end system 120 which communicates with the client device 130 and queries if the user authorizes the opening of the receiving device 110. When the user sends the authorization via the client device 130 to the back-end system 120, the back-end system 120 will authorize the processor 118 to send the signal 152 to unlock the receiving device 110. Thus, the receiving device 130 is able to unlock and release the receiving receptacle based on real-time/interactive authorization.

Besides interacting with a human courier, the receiving device 130 is also able to receive packages from an automated or unmanned courier, for example, a drone.

In some embodiments, the receiving device 110 is installed at a location that is within the range of a home WiFi system. In addition, the camera 116 can be configured to capture an image every time the motion sensor 114 or the screen 112 is triggered. In this way, images (e.g., of the courier) can be captured for verification or for security purposes. These images are then uploaded to the back-end system 120 as soon as a WiFi or 3G/4G connection is established by the receiving device 110. This feature can provide additional security, for example, by collecting incriminating evidence against any party who may try to steal the deposited packages.

Retrieving the Package by the User

A user (including a third party, different from the person having access to the client device 130) can retrieve the package by opening the locked receiving device 110 using one of several ways. The user can select an user option 204 displayed on the screen 112, as shown in FIG. 2A. The selection lead to a subsequent screen that allows the user to enter a password by selecting the button 222.

In some cases, the client device 130 can be used as an input device for entering password information. The client device 130 can also be used to send a password 162 (shown in FIG. 1B) to the back-end system 120. A password can also be stored locally on the receiving device 110. The password can be a certain portion of the tracking number. The password can be manually pre-set by the user prior to the scheduled drop-off of the package. The processor 118, after receiving the password from the back-end system and determining that the password 162 is valid, sends the signal 152 to unlock the receiving receptacle.

The processor 118 can include Bluetooth capability. FIG. 2D is a screenshot of the connectivity configuration setup available on the receiving device 110. In some embodiments, when Bluetooth features are enabled on both the client device 130 and the receiving device 110, the receiving device 110 can automatically detect if the client device 130 is close by. Once the presence of the client device 130 is detected, if the receiving device 110 is holding a package, the receiving device 110 will unlock automatically allowing the user to conveniently retrieve the package. In some embodiments, instead of automatically establishing Bluetooth connections between the client device 130 and the receiving device 110, the client device 130 can manually establish a Bluetooth connection with the receiving device 110. A command 222 can then be sent directly from the client device 130 to the receiving device 110, without going through the back-end system 120, to open the locked receiving device 110.

A preset code in the form of, for example, a barcode or a PIN number can also be generated in advance and provided to a third party who may want to open the receiving device 110.

The receiving device 110 can include a microphone that can receive audio information. Voice-recognition techniques can control the unlocking of the receiving device 100 for a particular user.

Additional Uses

The delivery management system 100 can also be used to return packages. The user can open the receiving receptacle to deposit the package to be returned, before locking the receiving device 110. The courier who picks up the package from the receiving device 110 can be provided with a PIN code to open the receiving device. The courier contracted to handle the return shipping can affix a shipping label containing a tracking number for the return shipment to the package when picking up the deposited package. Alternatively, the return shipping label can already be attached to the package deposited by the user. Using the locked receiving receptacle, there is added security for the deposited package to not be easier stolen while awaiting pickup by the courier. As described above, the camera 116 can capture photos of couriers who pick up the return package, for added security. The client device 130 can include applications that automatically request shipping quotations from various couriers for the return shipment. After the user selects a particular courier, the back-end system 120 directly transmits a PIN code to the selected courier for opening the locked receiving device 130 to retrieve the package for shipment.

Besides couriers, the delivery management system 100 can also be used to receive grocery deliveries from supermarkets or other suppliers. A thermal insert can be fitted or included in the receiving device 110 to keep groceries at a lower temperature. For example, for a particular grocery order, the delivery person can be supplied with a PIN code to open the receiving box in order to drop off the groceries. The groceries can be deposited before the user arrives home. Similarly, the thermal insert can also be used to keep take-out food orders warm. A take-out delivery person can be supplied with a PIN code when the take-out order is placed. The take-out orders can then be dropped off independently of a user's arrival at the user location. The receiving device 110 can protect the take-out orders from weather elements, providing a more hygienic storage environment for the take-out orders prior to consumption.

The delivery management system 100 can be interfaced with other independent modules. For example, the client device 130 can be used to prompt a user to provide customer feedback of a product that was previously deposited in the receiving device 110. The data collected from the client device 130 in this way can be used to improve one's online shopping experience. In addition, information aggregated across different delivery management systems 100 (belonging to different users) can be used to suggest other related purchases (the suggestions based on feedback received from other verified buyers of the different products).

The receiving device 110, when mounted on an exterior of a home, can connect to other smart devices in the home. For example, when a user interacts with the receiving device 110 prior to entering the home, the processor unit can send commands to turn on lights, set the thermostats, start air-conditioning or heating, in anticipation of the user's entry.

The speakers in the receiving device can also be used to provide audio reminder messages broadcast. For example, reminders to bring an umbrella when there is a rain forecast (such information can be transmitted from the back-end system 120 to the receiving device 100) when the motion sensor 114 senses that someone is leaving the home.

First Exemplary Implementation

Figures 3A, 3B:
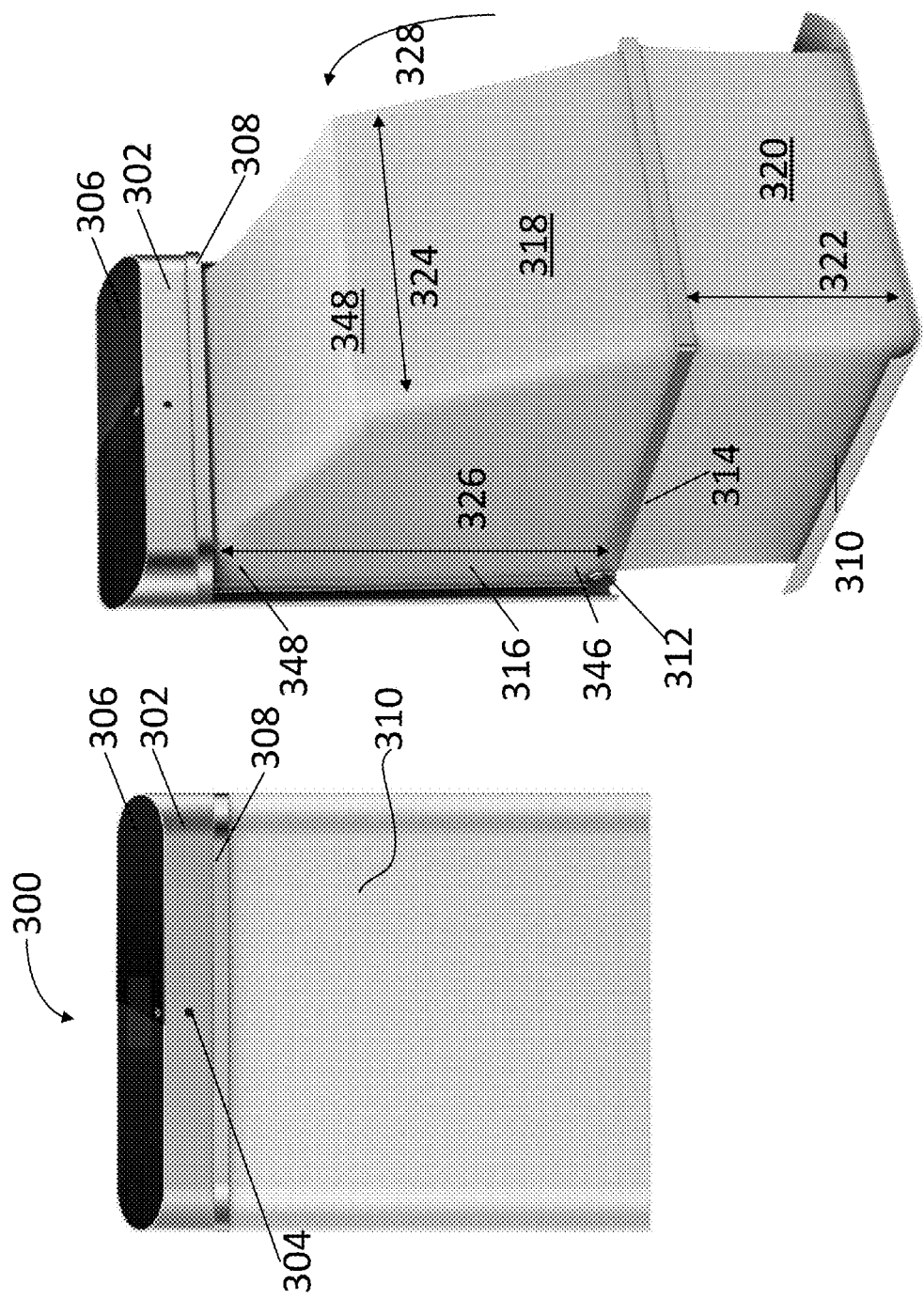
FIG. 3A is a front view of a first implementation of the receiving device before a receiving receptacle is deployed.
FIG. 3B is a perspective view of the device shown in FIG. 3A after the receiving receptacle is deployed.

FIG. 3A shows a front view of a locked receiving device 300 in an un-deployed state (i.e., a receiving receptacle has not been released from the receiving device). The receiving device 300 includes a control panel 302, a camera 304, an angled front panel 306, a lock mechanism 308, and a cover 310. The cover 310 can be made of a resilient metal like aluminum, or it can be a polymer material. A side profile of the receiving device 300 is shown in FIG. 3F. The locking mechanism 308 protrudes from the cover 310. An edge 340 of the cover 310 contacts an edge 342 of a back frame 316.

The front cover and the back frame can be symmetrically curved at the edges to match a curvature of the end portions 336 (FIG. 3G) of the front panel 306. The back frame 316 can be attached to a wall (e.g., exterior wall) of a residential unit. FIG. 3G shows a top view of the front panel 306. A top surface of the front panel 306 can be inclined with respect to a horizontal plane by about 30°. An on switch 333 can be provided in addition to a motion sensor to ensure that the screen 332 does not turn on whenever anyone walks past the receiving device 110. For example, the screen 332 can be turned on only when someone activate the on switch 333. In general, this angle can be chosen to improve the readability of a screen 332 on the front panel. The screen 332 can be a touch screen. Solar panels 330 are placed on the right and left sides of the screen 332. The solar panels can generate enough electricity to power the receiving device 300. The receiving device 300 can be configured to hibernate after a certain period of inactivity to conserve energy. In addition, a battery can also be used as a back-up source of power for the receiving device 300. A speaker can be provided within the control panel 302 or the front panel 306. Speaker holes can be provided adjacent the speaker on a housing of the control panel 302 or the front panel 306. In general, the speaker and speak holes can be provided at any location in the receiving device 130 that do not get exposed to weather elements (e.g., water). The motion sensor can be located next to the camera 304. A lock latch 303 (in FIG. 3E) can be provided under than control panel 302, and is not visible from the top view shown in FIG. 3G. The lock latch 303 can hold on to strike plate 309 on the locking mechanism 308.

To deploy the receiving receptacle of the receiving device 300 as shown in FIG. 3B, the locking mechanism 308 is first unlocked and released, and the cover 310 can be released from the locking mechanism 308. The cover 310 is then placed flat on the floor or the ground. The cover 310 only contacts the floor or the ground when receiving receptacle is released. The curved ends of the cover 310 extend above the ground. A support frame 312 can then be lowered from a vertical position into a horizontal position via a pivot 314. The support frame 312 is connected to the cover 310 via a first extendable section 320. The first extendable section can have a height 322 of greater than 5 inches (e.g., greater than 10 inches, greater than 13 inches, less than 15 inches). For example, the height 322 can be about 14 inches. The height 322 can correspond to the distance by which the lowest end 354 (see FIG. 3C) of the locked receiving device 300 is raised above the ground/floor level.

Materials for the extendable section 320 can include the polymer poly-paraphenylene terephthalamide, e.g., Kevlar™. When Kevlar™ is spun, the resulting fiber can have a tensile strength of more than 3,000 MPa (e.g., more than 3,100 MPa, more than 3,2000 MPa, more than 3,400 MPa, more than 3,600 MPa, about 3,620 MPa). The Kevlar™ material can prevent the extendable section 320 from being slashed or sliced open.

A second extendable section 318, which is connected to the support frame 312 can be extended by pulling from the support frame 312 along the direction 328. This is shown in greater details in FIG. 3E. A width 324 of the second extendable section can be greater than 10 inches (e.g., greater than 15 inches, greater than 20 inches). For example, the width 324 can be about 24 inches. The width 324 of the second extendable section 318 can be the same as the width of the first extendable section 320. A locking frame 350 is connected to the locking mechanism 308.

A third extendable section 348 extends between an intermediate support frame 352 and the locking frame 350. The second and extendable sections 318 and 348 together determine the height 326 of the deployed unit. The curved portions near the edges of the back frame 316 obstruct and protect the locking frame 350 from being pried open. A first end 346 (FIG. 3B) of the second extendable section 318 is also fixedly connected to the pivot 312, while a second end 348 is a free end that can be lifted into position from the support frame 312. A surface of a third extendable section 318 is inclined at a different angle with respect to the inclination of the surface of the second extendable section 318. The volume enclosed by the receiving receptacle which includes the first, second, and third extendable sections can be greater than 1000 cubic inches (e.g., greater than 3000 cubic inches, greater than 600 cubic inches, greater than 9000 cubic inches). For example, the volume can be about 9900 cubic inches.

Structural support at the edges of the first and second extendable sections 320, 318, and 348 are provided by the support frame 314, the intermediate frame 352, and the locking frame 350.

The locking mechanism 308 is connected to the cover 310 via the first and second extendable sections 318 and 320. The deployed unit is locked by aligning the opening of the second extendable section 318 against a vertical surface below the control panel 302, and the locking mechanism 308 is engaged with a lower portion of the control panel 302. All three sections 318, 320, and 348 can be made of material containing Kevlar™.

Figure 3C:
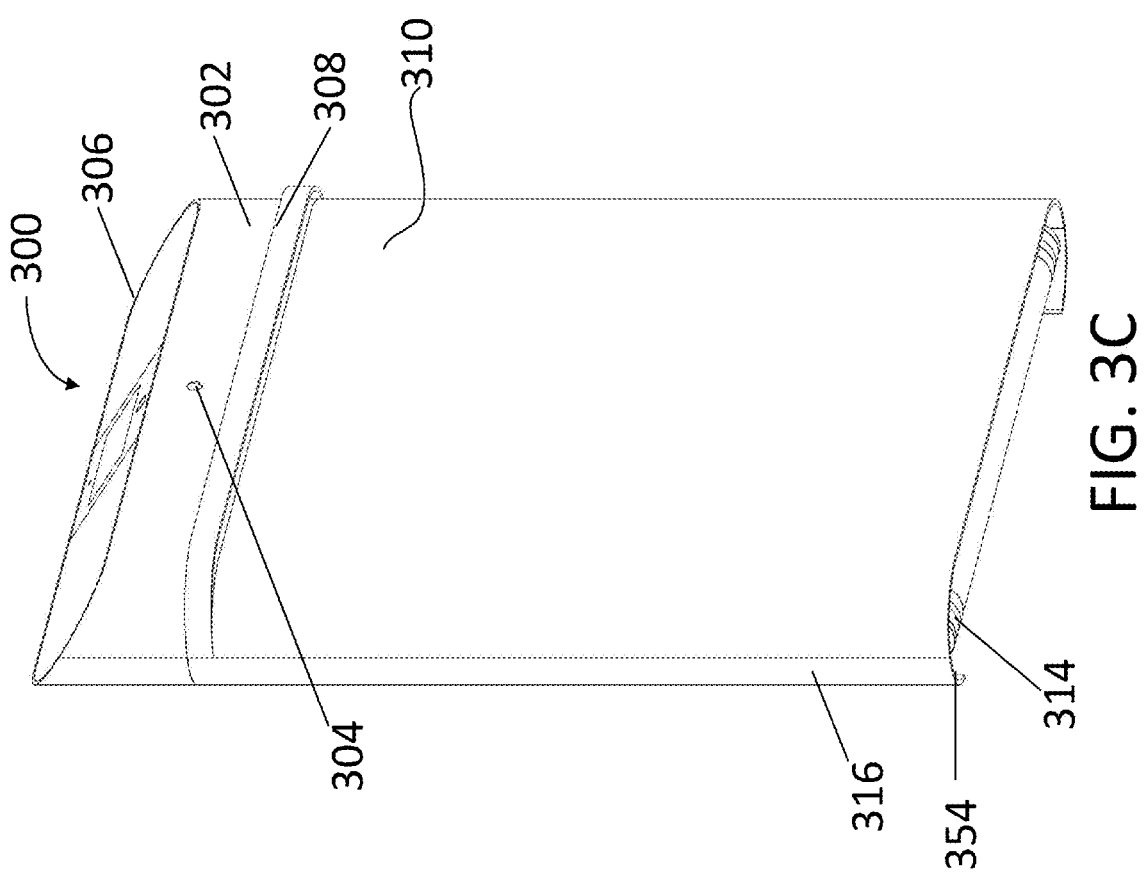
FIG. 3C is a perspective line drawing of the device shown in FIG. 3A before the receiving receptacle is deployed.
Figure 3E:
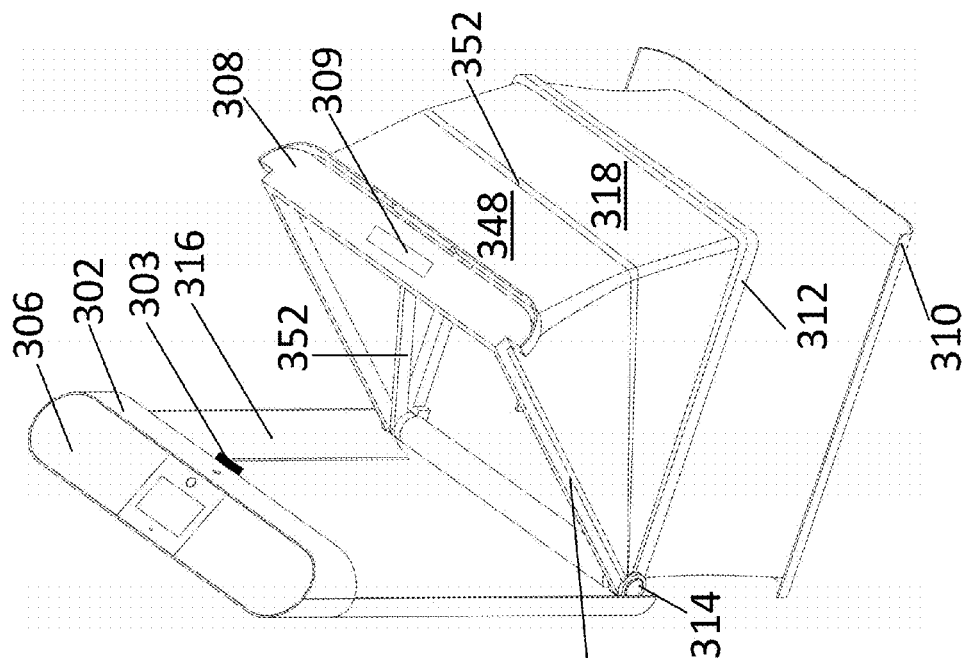
FIG. 3E is a perspective line drawing of the device shown in FIG. 3A while the receiving receptacle is being opened.
Figure 3D:
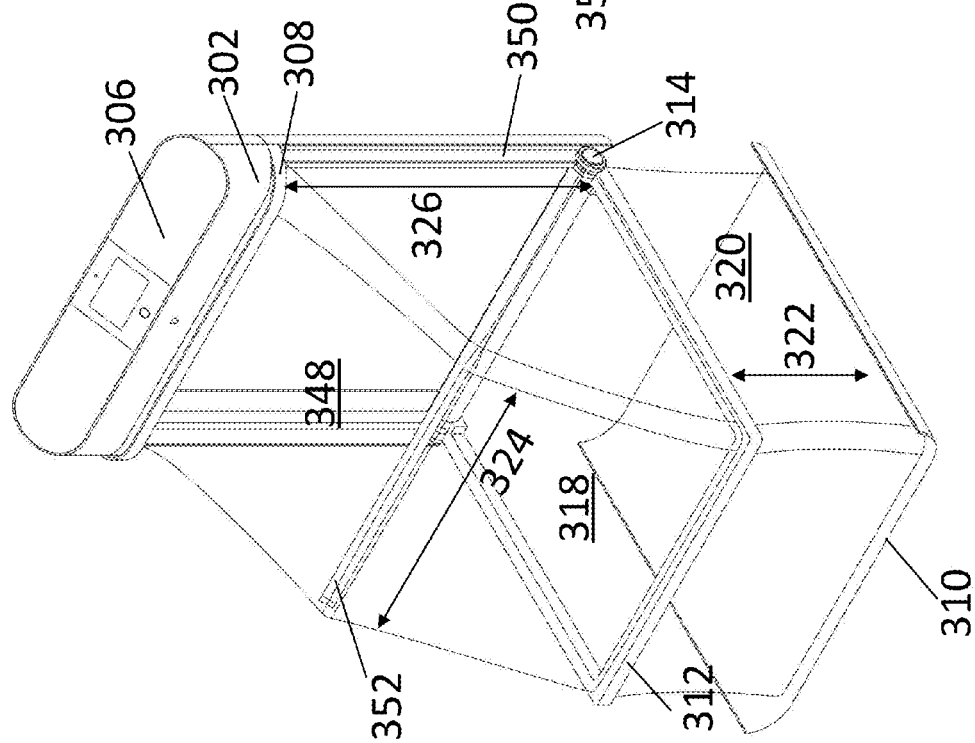
FIG. 3D is a perspective line drawing of the device shown in FIG. 3A after the receiving receptacle is deployed.

The perspective view depicted in FIG. 3C shows the arrangement of the hinged connection and the front cover 310 before the receiving receptacle is deployed. FIG. 3D shows the positions of support frame 312, intermediate frame 352, and locking frame 350 after the receiving receptacle is deployed and locked. Because the front cover 310 is configured to rest on the floor, the receiving device 300 does not need to support the weight of the packages deposited within the receiving receptacle.

A courier, upon unlocking the locking mechanism 308 and placing the front cover 310 on the ground, can place a package within the first extendable section 320 on top of the cover 310, because extending the second and third extendable sections 318 and 348 and locking the receptacle to secure the package within the receiving device 300.

Second Exemplary Implementation

FIG. 4a shows a second exemplary implementation of the receiving device 400. The control panel 302 is identical to the first exemplary implementation 300. FIG. 4A shows the un-deployed state of a receiving receptacle 402. A bottom surface 404 of the receiving receptacle is folded. As shown in FIG. 4B, when the receptacle 402 unlocks, a folding support frame 406 flanking sides 408 of the receptacle 402 can be extended and the sides 408 tautened. Packages can then be deposited into the receptacle. In the deployed state, the bottom surface 404 of the receptacle 402 is in contact with the ground/floor. In other words, the receiving receptacle 402 is supported by the floor only after it has been released from the locking mechanism 308. A height of the receptacle 402 can be greater than 10 inches (e.g., greater than 15 inches, greater than 20 inches, greater than 25 inches). The height can be approximately 28 inches. A width 412 of the receptacle can be greater than 10 inches, greater than 15 inches, greater than 20 inches, greater than 25 inches. For example, the width 412 can be about 27. A depth 414 of the receptacle can be greater than 5 inches, greater than 10 inches, greater than 15 inches. The depth 414 can be about 20 inches. The receptacle 402 can be made of Kevlar™. The locking mechanism in FIG. 4B is similar to that shown in FIG. 3E.

Third Exemplary Implementation

Figure 5B:
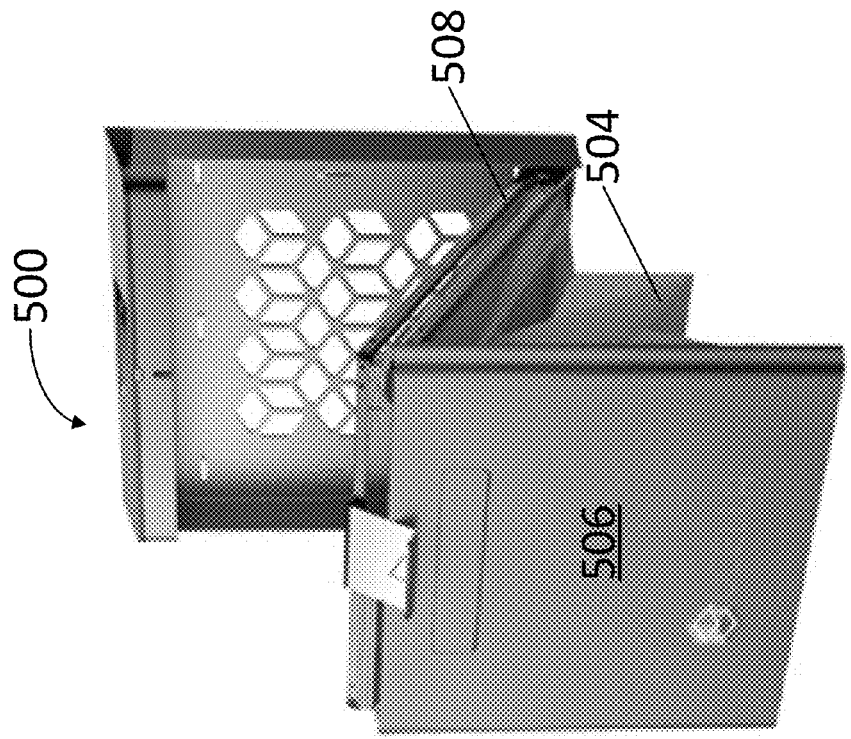
FIG. 5B is a side perspective view of the device shown in FIG. 5A as it is being deployed.
Figure 5A:
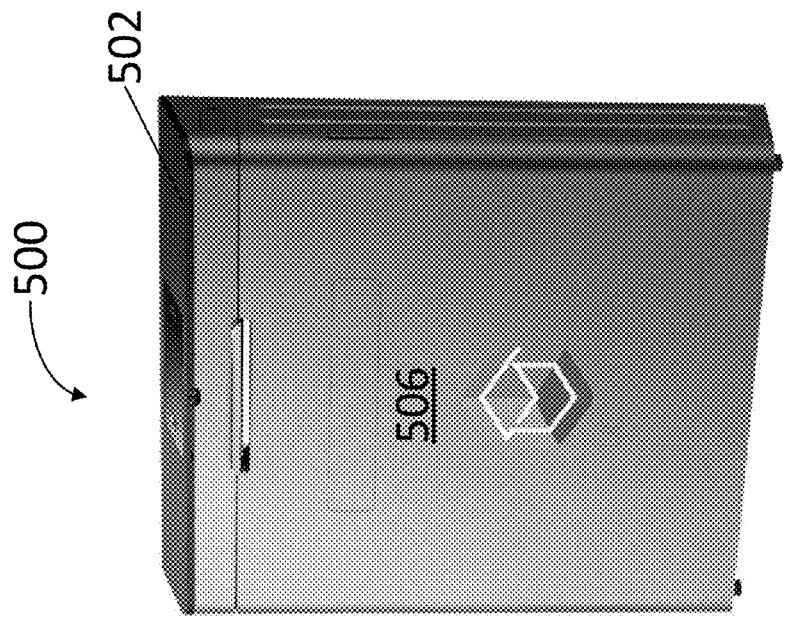
FIG. 5A is a front perspective view of a third implementation of the receiving device before a receiving receptacle is deployed.
Figure 5C:
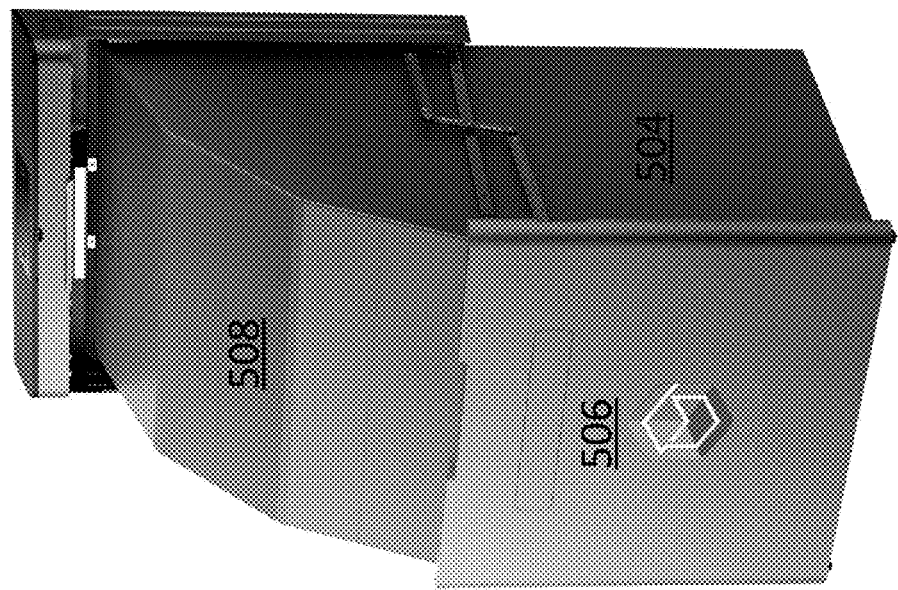
FIG. 5C is a side perspective view of the device shown in FIG. 5B after the receiving receptacle is fully extended.
Figure 5D:
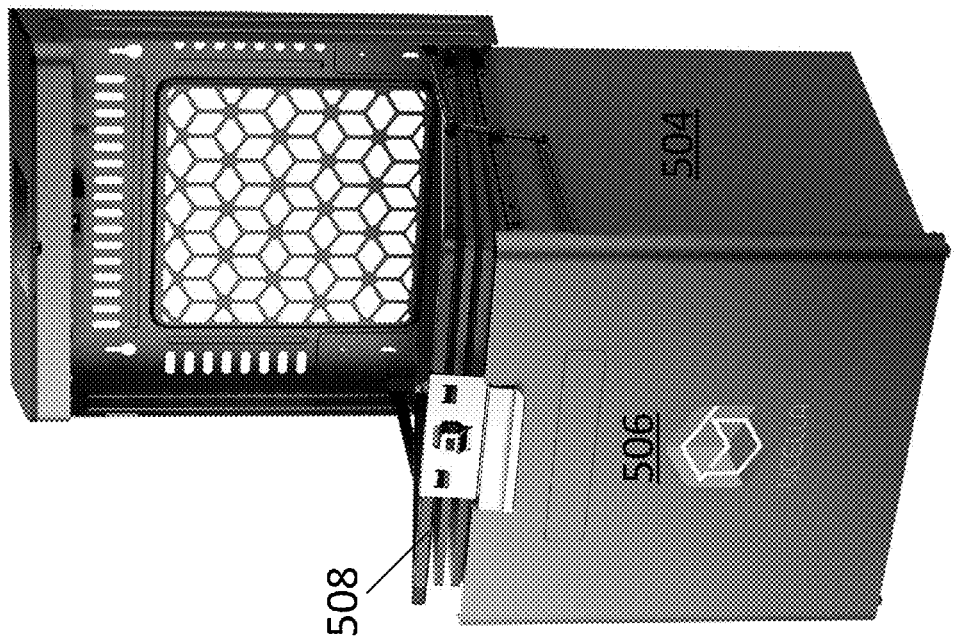
FIG. 5D is a side perspective view of the device shown in FIG. 5C after an extendable portion is deployed.
Figure 5E:
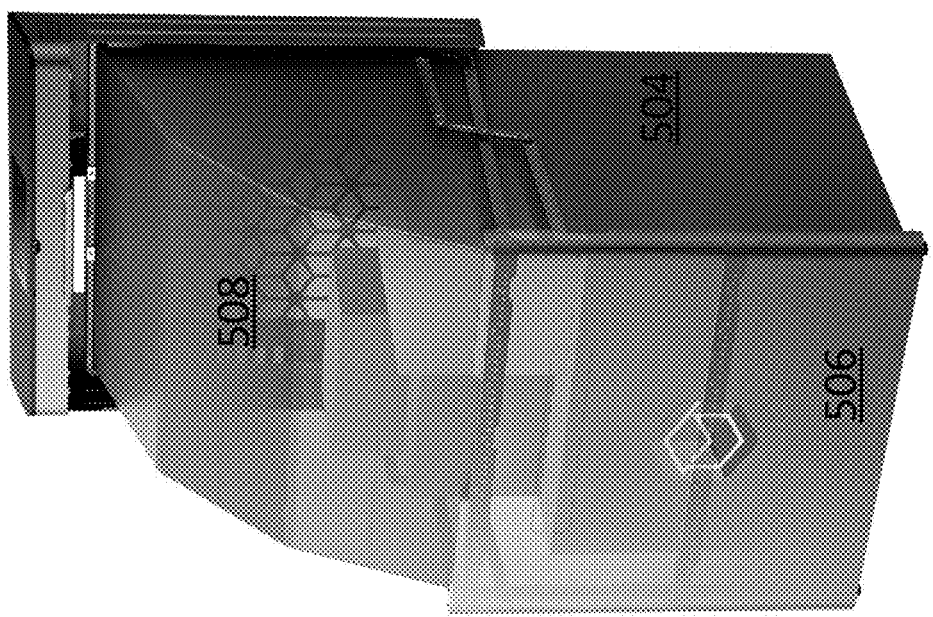
FIG. 5E is a side perspective view of the device shown in FIG. 5C, in which the inner contents enclosed by the receiving receptacle are also shown.

FIG. 5A shows a third exemplary implementation of the receiving device 500. The control panel 502 can be similar or identical to that of the first exemplary implementation 300. FIG. 5A shows the un-deployed state of the receiving device 500. As shown in FIG. 5B, when the receiving device 500 unlocks, a folding receptacle 504 can be extended and its sides tautened (shown in FIG. 5C). Packages can then be deposited into the receptacle. In contrast to the first exemplary implementation 300, a front panel 506 of the receiving device 500 remains upright in both the un-deployed and the deployed states. Having the front panel 506 being upright can reduce the chances of scratches or damage to the front panel. In the deployed state, a bottom surface of the receptacle 504 is in contact with the ground/floor. Here, the receiving receptacle 504 is supported by the floor only after it has been released from the locking mechanism. FIG. 5B shows the extendable portion 508 before it is extended to form can enclosed portion. FIG. 5C shows the expanded receiving receptacle 504 resting on the ground/floor. FIG. 5D shows the extendable portion 508 being lifted up from the horizontal position shown in FIG. 5C. The extendable portion 508 can then be locked. FIG. 5E shows a deployed receiving receptacle 508 holding a number of delivered boxes therein.

A height of the receptacle 504, including the extendable portion 508 can be greater than 30 inches (e.g., greater than 32 inches, greater than 35 inches, greater than 39 inches). The height can be approximately 39.4 inches. A width 412 of the receptacle can be greater than 10 inches, greater than 15 inches, greater than 20 inches. For example, the width can be about 20.8 inches. A depth 414 of the receptacle can be greater than 5 inches, greater than 10 inches, greater than 15 inches. The depth 414 can be about 20 inches. The receptacle 402 can be made of Kevlar™. The locking mechanism in FIG. 5D is similar to that shown in FIG. 3E.

A number of embodiments of the invention have been described. Nevertheless, it will be understood that various modifications may be made without departing from the spirit and scope of the invention. Accordingly, other embodiments are within the scope of the following claims.

What is claimed is:

1. A package receiving device, the package receiving device comprising:
   a sensor configured to obtain package identifying information from a package;
   a verification module configured to determine if the package identifying information matches information stored in a computer-readable storage media;
   a receptacle configured to change from a compact mode to an extended mode to secure the package therein based on a determination of the verification module that the package identifying information matches the information stored in the computer-readable storage media, wherein the verification module sends a notification message to a remote system when the receptacle changes from the compact mode to the extended mode; and
   wherein the receptacle includes a front panel, a folding receptacle portion, and an extendable portion, the front panel remaining in a vertical position in both the compact mode and the extended mode, the folding receptacle portion expanding to increase in volume in the extended mode to receive the package therein, and the extendable portion lifting upwardly from a horizontal position to a locking position in the extended mode such that the extendable portion is in communication with the folding receptacle portion to enclose the package in the receptacle.

2. The package receiving system device of claim 1, further comprising a motion sensor, wherein the motion sensor comprises a camera and the camera captures an image when the motion sensor is activated.

3. The package receiving system device of claim 2, further comprising a power source, wherein the sensor and the verification module are configured to be in standby mode until the motion sensor is activated.

4. The package receiving system device of claim 3, wherein the power source comprises a solar panel.

5. The package receiving device of claim 1 is configured to be mounted on a vertical surface perpendicular to ground surface.

* * * * *